US011232381B2

(12) United States Patent
Marvin et al.

(10) Patent No.: US 11,232,381 B2
(45) Date of Patent: Jan. 25, 2022

(54) SYSTEMS AND METHODS FOR MANAGING RESOURCES IN AN INFORMATION TECHNOLOGY (IT) INFRASTRUCTURE

(71) Applicant: JPMorgan Chase Bank, N.A., New York, NY (US)

(72) Inventors: Darren Marvin, Poole (GB); Thomas Williams, Poole (GB); Hani El Sayyed, Bournemouth (GB); Dane Z. Payne, Bournemouth (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 157 days.

(21) Appl. No.: 15/918,504

(22) Filed: Mar. 12, 2018

(65) Prior Publication Data

US 2018/0260754 A1 Sep. 13, 2018

Related U.S. Application Data

(60) Provisional application No. 62/469,586, filed on Mar. 10, 2017.

(51) Int. Cl.
| | |
|---|---|
| *G06Q 10/06* | (2012.01) |
| *G06N 5/02* | (2006.01) |
| *G06F 16/901* | (2019.01) |
| *G06T 11/20* | (2006.01) |
| *G06N 20/00* | (2019.01) |

(52) U.S. Cl.
CPC ... *G06Q 10/06315* (2013.01); *G06F 16/9024* (2019.01); *G06N 5/02* (2013.01); *G06N 20/00* (2019.01); *G06T 11/206* (2013.01)

(58) Field of Classification Search
CPC ........ G06Q 10/063; H04L 41/12; H04L 43/50
See application file for complete search history.

(56) References Cited

U.S. PATENT DOCUMENTS

| | | | |
|---|---|---|---|
| 8,572,290 B1* | 10/2013 | Mukhopadhyay | .... G06F 16/134 709/251 |
| 2003/0131011 A1* | 7/2003 | Haunschild | ............ G06Q 10/10 |
| 2016/0321574 A1* | 11/2016 | Peterson | .............. G06Q 50/265 |
| 2016/0330132 A1* | 11/2016 | Rickey | ....................... G06F 8/60 |
| 2017/0068963 A1* | 3/2017 | Saxena | .......... G06Q 10/063112 |
| 2017/0293666 A1* | 10/2017 | Ragavan | .................. G06N 5/02 |
| 2017/0302524 A1* | 10/2017 | Iorga | ..................... H04L 45/021 |
| 2018/0089042 A1* | 3/2018 | Demetriou | ............. G06N 5/022 |

* cited by examiner

*Primary Examiner* — Patricia H Munson
*Assistant Examiner* — Marjorie Pujols-Cruz
(74) *Attorney, Agent, or Firm* — Greenberg Traurig LLP (57) ABSTRACT

Systems and methods for managing resources in an IT infrastructure are disclosed. In one embodiment, in an information processing apparatus comprising at least one computer processor, a method for managing resources in an IT infrastructure may include: (1) retrieving, from a database, an identification of a plurality of IT infrastructure resources for an organization; (2) retrieving at least one attribute for each IT infrastructure resource; (3) graphing an IT infrastructure for the organization by illustrating a relation of each IT infrastructure resource to at least one other IT infrastructure resource and the attributes for each IT infrastructure resource; (4) analyzing the graph in order to identify a potential IT infrastructure resource for removal from the IT infrastructure for the organization; and (5) implementing a decision engine to recommend removal or maintenance of the identified IT infrastructure resource.

20 Claims, 6 Drawing Sheets

SYSTEMS AND METHODS FOR MANAGING RESOURCES IN AN INFORMATION TECHNOLOGY (IT) INFRASTRUCTURE

RELATED APPLICATIONS

The present application claims priority to U.S. Provisional Patent Application Ser. No. 62/469,586 filed Mar. 10, 2017, the disclosure of which is hereby incorporated, by reference, in its entirety.

BACKGROUND OF THE INVENTION

1. Field of the Invention

Embodiments generally relate to a graphical system and method for analyzing and managing an information technology (IT) infrastructure to reduce costs and inefficiencies.

2. Description of the Related Art

Many large organizations utilize a vast inventory of infrastructure resources such as virtual and physical servers, storage apparatus including storage area networks (SAN) and network-attached storage (NAS), and backup and network resources. In order to efficiently manage the infrastructure resources, it is necessary to maintain an inventory of these resources. Providing a single inventory source of record for all enterprise infrastructure resources is a significant challenge, and has been addressed using various systems and processes.

Even given an accurate inventory of resources, the further challenge remains of understanding the inter-dependencies between the infrastructure resources across an enterprise. Existing systems fail to address this challenge on an enterprise level. This lack of visibility into enterprise infrastructure resource relationships is a significant inhibitor to effective large-scale efficiency analysis.

Identifying a single resource or combination of resources that can be removed from operation due to either redundancy or low utilization requires understanding the dependencies/relationships between those resources and others within the enterprise. Effective enterprise-scale infrastructure cost savings opportunity analysis requires an alternative approach to representing and reasoning over infrastructure resource relationships.

Current methods for establishing potential infrastructure cost savings opportunities cannot easily represent and reason over inter-dependencies between infrastructure resources and hence cannot establish more complex opportunities that involve many different technologies. Current methods cannot necessarily scale to provide a complete relationship representation of an enterprise infrastructure.

SUMMARY OF THE INVENTION

Systems and methods for managing resources in an IT infrastructure are disclosed. In one embodiment, the method may include storing, in a computer memory, instructions for managing IT infrastructure resources and information associated with each IT infrastructure resource. The information includes relationship information indicating the relationship of each IT infrastructure resource with other IT infrastructure resources. The method additionally includes utilizing a computer processor to access the computer memory and execute the stored instructions in order to perform multiple steps. The steps include graphing the IT infrastructure by illustrating the relation of each IT infrastructure resource to the other IT infrastructure resources and analyzing the graph in order to identify potential IT infrastructure resources for decommissioning/removal. The method additionally includes performing a cost analysis to isolate costs associated with the decommissioning/removal and implementing a decision engine to recommend decommissioning/removal or maintenance of the identified IT infrastructure resource.

In an additional aspect, a system is provided for managing resources in an IT infrastructure. The system includes a computer memory storing instructions for managing IT infrastructure resources and information associated with each IT infrastructure resource. The information includes relationship information indicating the relationship of each IT infrastructure resource with other IT infrastructure resources and a graphing engine accessing the computer memory and graphing the IT infrastructure in order to illustrate the relation of each IT infrastructure resource to the other IT infrastructure resources. The system further includes a graphical analysis engine analyzing the graph in order to identify potential IT infrastructure resources for decommissioning/removal and a cost analysis engine performing a cost analysis to isolate costs associated with the decommissioning/removal. The system further includes a decision engine recommending decommissioning/removal or maintenance of the identified IT infrastructure resource, wherein the graphing engine, the graphical analysis engine, the cost analysis engine, and the decision engine are executed by at least one computer processor.

In one embodiment, in an information processing apparatus comprising at least one computer processor, a method for managing resources in an IT infrastructure may include: (1) retrieving, from a database, an identification of a plurality of IT infrastructure resources for an organization; (2) retrieving at least one attribute for each IT infrastructure resource; (3) graphing an IT infrastructure for the organization by illustrating a relation of each IT infrastructure resource to at least one other IT infrastructure resource and the attributes for each IT infrastructure resource; (4) analyzing the graph in order to identify a potential IT infrastructure resource for removal from the IT infrastructure for the organization; and (5) implementing a decision engine to recommend removal or maintenance of the identified IT infrastructure resource.

In one embodiment, the method may further include performing a cost analysis to isolate costs associated with the removal of the potential IT infrastructure resource for removal.

In one embodiment, the IT infrastructure for the organization may be graphed using an open source graphing tool.

In one embodiment, the potential IT infrastructure resource for removal may be a disconnected IT infrastructure resource.

In one embodiment, the potential IT infrastructure resource for removal may be an IT infrastructure resource in a loosely attached sub-graph.

In one embodiment, the step of analyzing the graph in order to identify a potential IT infrastructure resource for removal comprises identifying infrastructure dependencies among the IT infrastructure resources.

In one embodiment, the attribute may include a usage of the IT infrastructure resource.

In one embodiment, the attribute may include a policy or regulatory restriction on the IT infrastructure resource.

In one embodiment, the decision engine may be a machine learning-based decision engine.

According to another embodiment, a system for managing resources in an IT infrastructure may include a server comprising a memory and a computer processor; a database comprising an identification of a plurality of IT infrastructure resources for an organization; a graphing engine; a graphical analysis engine; and a decision engine. The server may retrieve, from a database, the identification of the plurality of IT infrastructure resources for the organization and at least one attribute for each IT infrastructure resource. The graphing engine may graph an IT infrastructure for the organization by illustrating a relation of each IT infrastructure resource to at least one other IT infrastructure resource and the attributes for each IT infrastructure resource. The graphical analysis engine may analyze the graph to identify a potential IT infrastructure resource for removal from the IT infrastructure for the organization. The decision engine may recommend removal or maintenance of the potential IT infrastructure resource.

In one embodiment, the system may further include a cost analysis engine, and the cost analysis engine may perform a cost analysis to isolate costs associated with the removal of the potential IT infrastructure resource for removal.

In one embodiment, the graphing engine graphs the IT infrastructure for the organization using an open source graphing tool.

In one embodiment, the potential IT infrastructure resource for removal comprises a disconnected IT infrastructure resource, an IT infrastructure resource in a loosely attached sub-graph, etc.

In one embodiment, the graphical analysis engine identifies infrastructure dependencies among the IT infrastructure resources.

In one embodiment, the attribute comprises a usage of the IT infrastructure resource.

In one embodiment, the attribute comprises a policy or regulatory restriction on the IT infrastructure resource.

In one embodiment, the decision engine is a machine learning-based decision engine.

According to another embodiment, a system for managing resources in an IT infrastructure may include a computer memory storing instructions for managing IT infrastructure resources and information associated with each IT infrastructure resource, the information including relationship information indicating the relationship of each IT infrastructure resource with other IT infrastructure resources; a graphing engine accessing the computer memory and graphing the IT infrastructure in order to illustrate the relation of each IT infrastructure resource to the other IT infrastructure resources; a graphical analysis engine analyzing the graph in order to identify potential IT infrastructure resources for removal; a cost analysis engine performing a cost analysis to isolate costs associated with the removal; and a decision engine recommending removal or maintenance of the identified IT infrastructure resource, wherein the graphing engine, the graphical analysis engine, the cost analysis engine, and the decision engine are executed by at least one computer processor.

In one embodiment, the system may further include a resource information gathering engine for gathering information associated with each IT infrastructure resource.

In one embodiment, the graphing engine may use an open source graphing tool for graphing the IT infrastructure.

In one embodiment, the graphical analysis engine may analyze the graph by identifying disconnected graphs.

In one embodiment, the graphical analysis engine may analyze the graph by identifying loosely attached sub-graphs.

In one embodiment, the graphical analysis engine may analyze the graph by identifying infrastructure dependencies.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

In order to enhance efficiencies and effectively manage an IT infrastructure, embodiments are directed to a system that considers relationships and interdependencies among resources in an enterprise. The systems further facilitate analysis of interdependencies that may result in elimination of redundancies and excessive costs.

In embodiments, graph structures and associated graph analytics methods represent a good scalable fit for representing the inter-dependencies and relationships between infrastructure resources within an enterprise and reasoning about those resources for the purpose of identifying opportunities to save infrastructure cost.

Enterprise resources that carry some cost (either purely internally or an indirect external dollar charge) to the enterprise may be represented by entities that have attributes that describe them. Often, numerous attributes are associated with a single resource entity. Embodiments may focus on attributes that either act as restrictions on disposal of a resource (e.g., regulatory, data privacy, jurisdictional, etc.) or attributes reflective of utilization. The disclosed systems and methods may combine these attributes along with a cost factor, which may be an internal indirect cost or external direct cost, with established graph analytics methods to identify savings opportunities. For the system and method to recommend decommissioning/removal of a resource, some form of quantifiable monetary benefit must be established to trade off against the implementation cost and any constraints (e.g., regulatory, data privacy, jurisdictional, etc.).

Figure 1:
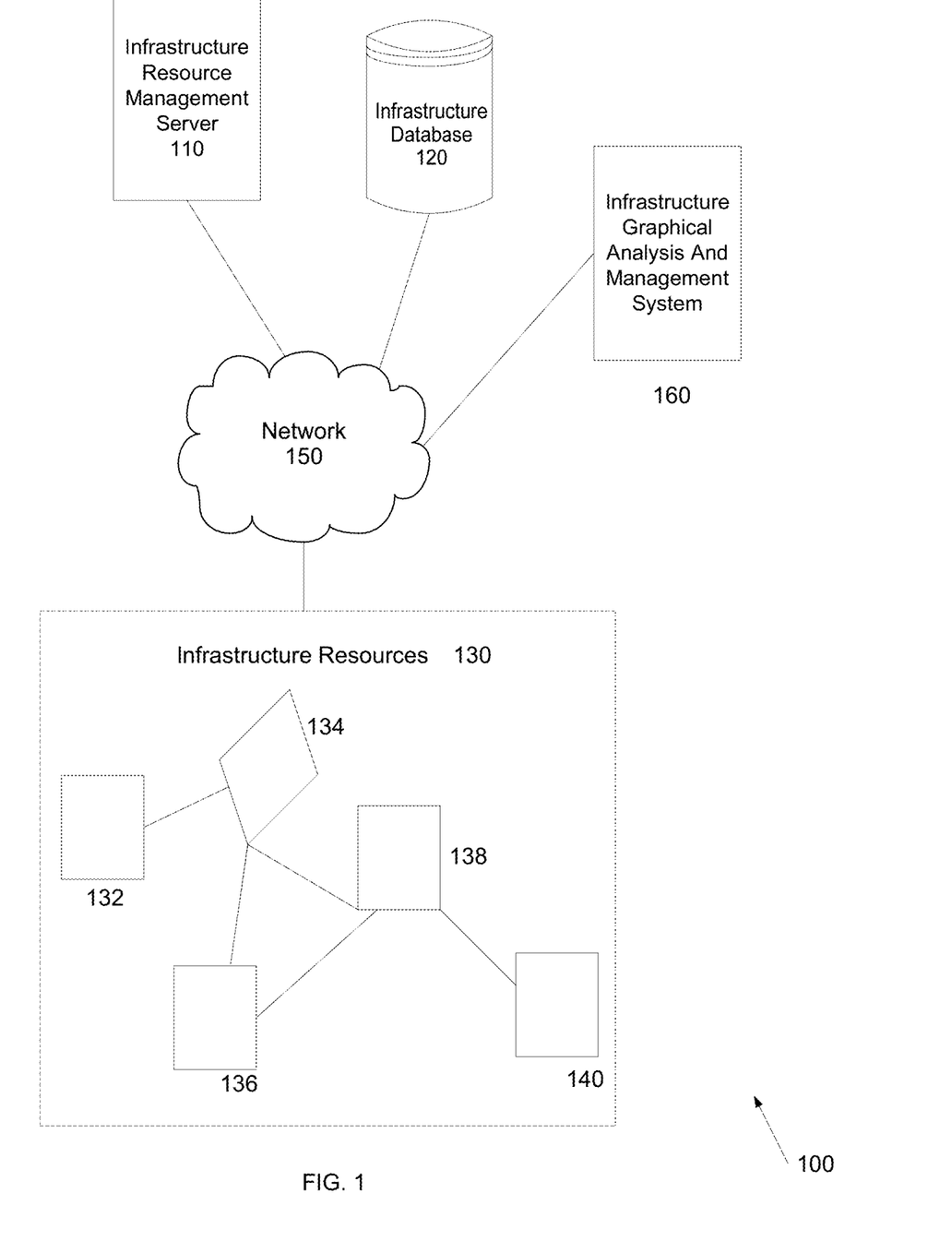
FIG. 1 depicts a block diagram illustrating an operating environment for an infrastructure graphical analysis and management system in accordance with an embodiment.

FIG. 1 is a block diagram illustrating operating environment 100 for an infrastructure graphical analysis and management system in accordance with an embodiment. Operating environment 100 may include infrastructure management server 110, infrastructure database 120, and infrastructure graphical analysis and management system 160. All of these systems may be connected over one or more networks to infrastructure resources 130.

Infrastructure management server 110 may be, or may include, a computing system that captures data pertaining to infrastructure resources 130. Infrastructure management server 110 may capture the data upon resource installation and may be updated periodically to reflect decommissioning/removal and addition of infrastructure resources 130.

In one embodiment, infrastructure management server 110 may query or ping infrastructure resources 130 periodically or as necessary and/or desired to update the status of the infrastructure resources 130.

In one embodiment, each infrastructure resource 130 may register with infrastructure management server 110 when it is onboarded/commissioned.

Infrastructure management server 110 may also store information pertaining to the infrastructure resources 130 in infrastructure database 120. The stored information may include, for example, hygiene information (e.g., machine readable attributes related to end of life, status, vulnerability, etc.), usage information, age information, health information, dependency information, cost information, associated policy and/or regulation information, restriction information, etc., and any other information available about the IT resources. For example, database 120 may be a computer storage system that stores a large amounts of data. For example, database 120 may be an HP 3PAR StoreServ® Storage system. Those of ordinary skill in the art will appreciate that other computer storage system for storing large amounts of data are well known in the art.

Data stored in databases 120 may be managed and communicated with an Object-Relational Database Management System, such as Postgre®. Those of ordinary skill in the art will appreciate that other Object-Relational Database Management Systems are well known in the art.

Network(s) 150 may be the Internet, or may include other suitable networks. For example, network(s) 150 may include a wired or wireless local area network (LAN) and a wide area network (WAN), wireless personal area network (PAN), cellular networks, and other types of networks. Computers may be connected over the Internet, an Intranet, Extranet, Ethernet, or any other system that provides communications.

Infrastructure resources 130 may include any type of IT resources, such as virtual and physical servers, memory resources, such as SANs, NAS, etc. In one embodiment, infrastructure resources 130 may be shared resources, or may have dependencies and/or relationships with other resources, applications, etc. These resources are exemplary only, and it should be recognized that any type of suitable IT infrastructure resource may be included for analysis, decommissioning, and/or removal.

Although IT resources 130 are shown as interconnected elements (e.g., elements 132, 134, 136, 138, and 140), it should be recognized that these connections are merely exemplary as the resources may be connected in many different configurations.

In one embodiment, IT resources 130 may provide hygiene, health and/or status information (e.g., age, usage, end of life, vulnerability, etc.) as is necessary and/or desired.

Infrastructure graphical analysis and management system 160 may operate to extract stored information, utilize graphical tools to represent IT resources based on the stored information, analyze the graphical representation, and make modifications or recommendations for modifications based on the analysis.

Figure 2:
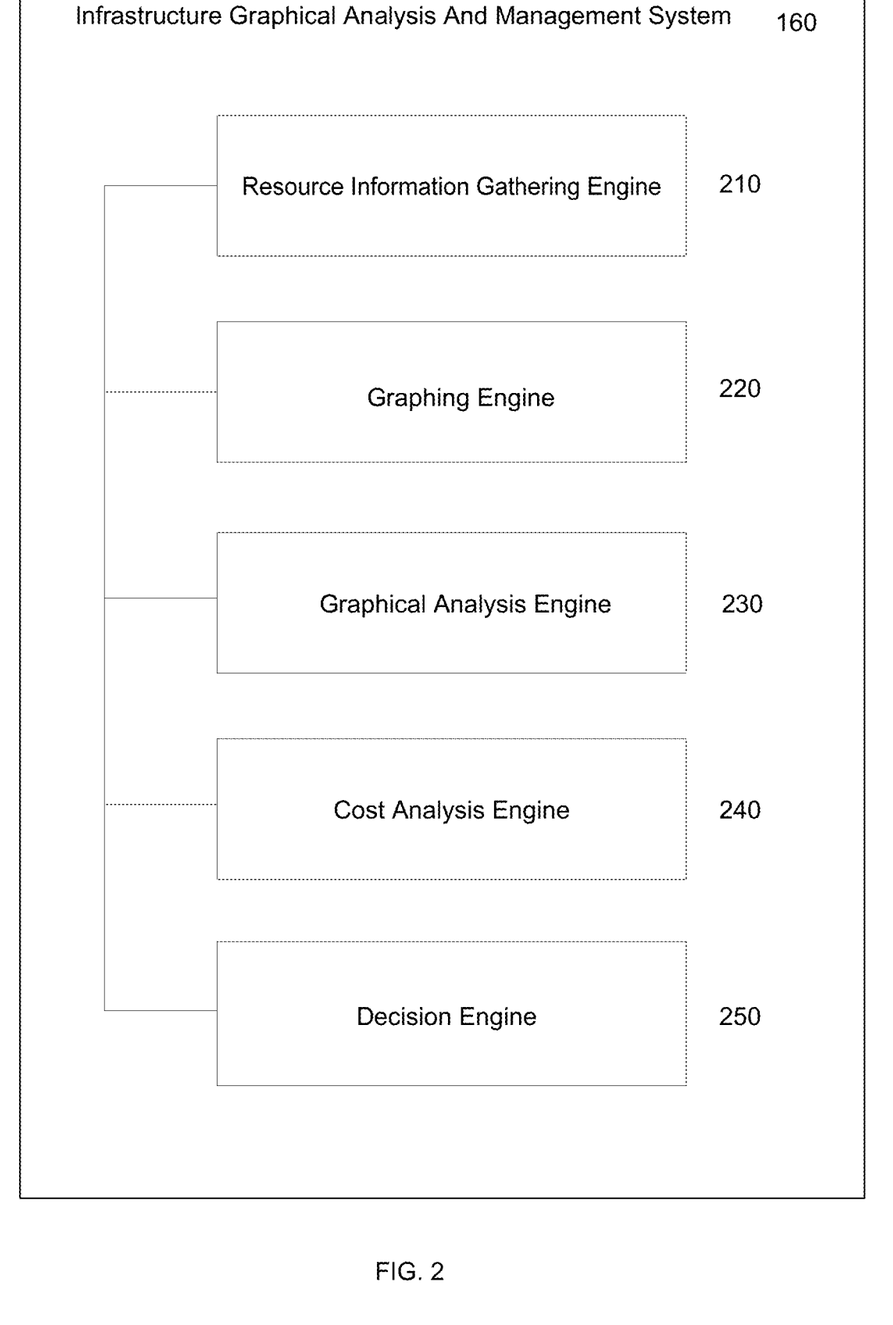
FIG. 2 illustrates components of an infrastructure graphical analysis and management system in accordance with an embodiment.

FIG. 2 is a block diagram illustrating components of infrastructure graphical analysis and management system 160 in accordance with an embodiment Infrastructure graphical analysis and management system 160 may include one or more interconnected servers including a programmed processor and a memory storing instructions. Infrastructure graphical analysis and management system 160 may include resource information gathering engine 210, graphing engine 220, graphical analysis engine 230, cost analysis engine 240, and decision engine 250.

Resource information gathering engine 210 may gather information regarding IT infrastructure resources from available sources, such as, for example, infrastructure database or infrastructure resource management system 160. Resource information gathering engine 210 may operate periodically, continuously, or upon request by a user through a user interface.

In one embodiment, information about the health and/or usage of IT infrastructure resources may be gathered from the infrastructure database, resource management system, the manufacturer, and/or from the IT infrastructure resources themselves.

Graphing engine 220 may operate on the gathered information to graphically illustrate the IT infrastructure components. Graphing engine 220 may utilize open source distributed graph technologies, such as, for example Apache Spark GraphX™. The utilization of open source tools provides value as infrastructure resource graph analytics may require expansion of features in existing graph toolsets. However, custom or proprietary graphing tools may also be utilized.

Graphical analysis engine 230 may operate on a graphical representation produced by graphing engine 220 to identify resources that may potentially be decommissioned, transitioned from, etc. Graphical analysis engine 230 may identify several unique situations. First, graphical analysis engine 230 may identify disconnected graphs. These disconnected graphs may represent a potential group of infrastructure resources that may be removed without impact.

The disconnected graph may not always include information regarding all parties that use the resources identified by the graph. Thus, the disconnected graph may also have a value that represents its utilization so that the analysis engine may establish if further information, consultation, or analysis is needed. This additional consultation or analysis may evaluate the trade off with the financial cost of the infrastructure represented by the disconnected graph.

Graphical analysis engine 230 may also identify loosely attached sub-graphs. In some situations, sub-graphs of infrastructure resources may only be connected to the rest of the enterprise resource graph by a small number of vertices. These loosely attached sub-graphs may be highlighted by high "between-ness" centrality of a node. If the sub-graph has significant financial cost, then the associated high between-ness centrality nodes may require further consultation with system participants regarding any engineering effort required to decouple the sub-graph and establish an opportunity for decommissioning/removal.

Examples of techniques for determining betweenness centrality include, the Brandes algorithm, the Floyd-Warshall algorithm, Johnson's algorithm, combinations thereof, etc. The Brandes algorithm may be useful if the vertices are unweighted, while the other algorithms may be useful if the vertices are weighted.

Examples of techniques that may be used to identify or find disconnected graphs include the Flood Fill algorithm and its derivatives.

After disconnected and loosely attached sub-graphs are identified, a bespoke domain specific ruleset may be applied to the resource (i.e., graph node) attributes to impose exclusion or threshold rules that determine whether the resource may be decommissioned. Exemplary resource attributes include utilization, regulatory, policy, data privacy, jurisdictional constraints that can reflect the geographical location of the resource and the application(s) using the resource, etc.

For example, the attribute rulesets may initially be set, but may then be refined using, for example, machine learning techniques such as decision trees, as the scope of adoption of the solution expands and a training set of decommissioned resources expands.

Graphical analysis engine 230 may also identify infrastructure dependencies for acting on a decommissioning opportunity. Once a decommissioning opportunity has been identified, the graphical representation may present a complete source of dependencies that allow decommissioning scripts and processes in order to act on that decommissioning opportunity. Additional validation may be applied using the list of dependencies by scripts and processes.

Cost analysis engine 240 may analyze costs associated with decommissioning/removal of resources identified by the graphical analysis engine. Thus, cost analysis engine 240 may consider data associated with resources found in disconnected graphs or loosely attached subgraphs in order to determine the cost of decommissioning/removal versus the cost of maintaining the resource in the current infrastructure.

Decision engine 250 may make decommissioning/removal decisions and/or recommendations based on the analysis provided by graphical analysis engine 230 and cost analysis engine 240.

Figure 3:
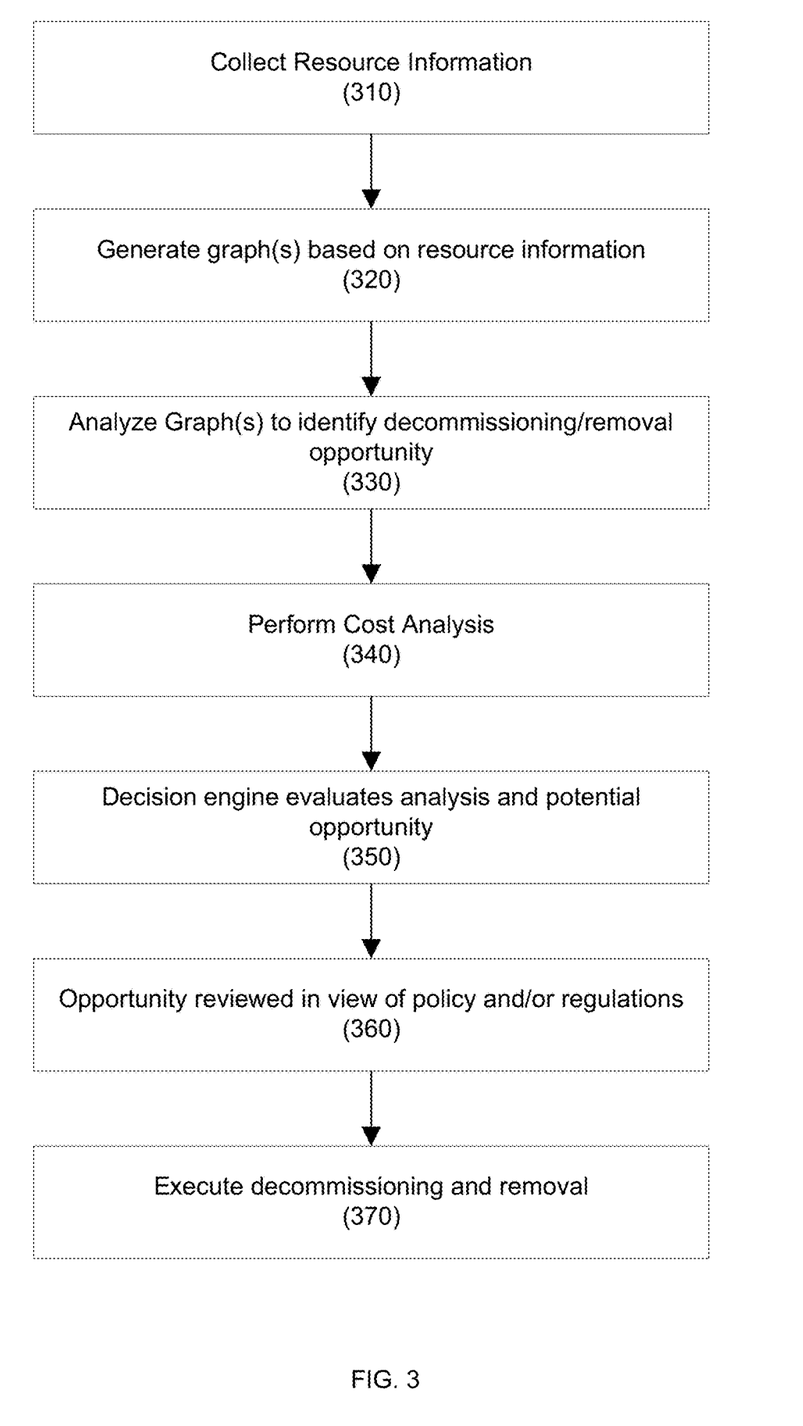
FIG. 3 is a flow chart illustrating a management method in accordance with an embodiment.

FIG. 3 is a flow chart illustrating a management method in accordance with an embodiment. In step 310, the system, using the resource information gathering engine, may collect resource information from systems and or databases storing the information. For example, resource attributes may be retrieved from an organizational systems of record database, runtime utilization attributes may be retrieved from infrastructure specific metrics time series databases, etc. These attributes may be combined, linked, associated, etc. to provide a graphical representation of the resources, including resource attributes required to exercise the domain ruleset.

In one embodiment, probes may be provided on infrastructure resources and may provide attribute information.

In step 320, the graphing engine described above may generate or develop graphs based on the collected information. In one embodiment, the graphing engine may graph each IT resource, and its connections to users, programs, applications, other IT resources, etc.

For example, one or more graph(s) may be constructed based on, for example, identified resources of interest from systems of record. Resources may be represented as graph nodes, and resource attributes (e.g., usage, restrictions, resource expiration or end-of-life dates, etc.) of interest may be identified and represented as light-weight attributes of the node representation. In one embodiment, resource attributes of interest may be represented as full graph nodes if the attributes represent a complex relationship.

In step 330, the graphical analysis engine may identify specific graphical features that are indicative of a decommissioning/removal opportunity for a resource. For example, the graphical analysis engine may identify disconnected graphs or loosely attached subgraphs, IT resources that are underutilized, resource expiration dates, resource end-of-life dates, etc. Any form of infrastructure asset is a potential resource may be considered.

In step 340, the cost analysis engine may perform a cost analysis on the graphical features identified by the graphical analysis engine to determine a cost of resource decommissioning/removal. The cost analysis engine may also determine the cost of maintaining the identified resources in the infrastructure.

In one embodiment, a cost analysis may be based on established internal charging models that may reflect the complete internal cost of an asset, including, for example, hosting, rather than vendor list pricing that may not be reflective of organizational discounts.

In step 350, the decision engine may evaluate the analyses provided and determine whether resource decommissioning/removal is recommended.

In step 360, if decommissioning/removal is recommended, a rules engine may perform policy and/or regulation analysis to determine whether the decommissioning/removal is allowed. For example, in one embodiment, a policy and/or regulation (e.g., a jurisdictional regulation) may require a SAN storing certain information to be isolated from other SANs, applications, users, etc. In that case, even though decommissioning/removal may be recommended, the decommissioning/removal may violate a regulatory and/or policy consideration, and may be overruled.

In one embodiment, any manual overrides for decommissioning/removal may be applied as is necessary and/or desired.

In one embodiment, any warnings associated with the decommissioning/removal of the resource may be escalated for human review. The ruleset may be updated based on the result of the escalation, and may be used to train the rules engine.

In step 350, any automated action may be taken as is necessary and/or desired. For example, if decommissioning/removal is recommended, and there are no policy, regulatory, or other overrides, the resource may be decommissioned and removed automatically without manual intervention. In one embodiment, this may involve executing a removal or decommissioning script where any actions (e.g., copying data, migrating use to another resource, etc.) may be taken before the resource is decommissioned and/or removed.

In one embodiment, if necessary, data may be moved from the decommissioned resource to a different resource, applications may be migrated to the new resource, etc. In general, because the resource may be decommissioned/removed due to low utilization, the amount of data movement or migration may be minimal.

After the resource is decommissioned, and no further application or other dependency exists, the resource may be physically removed. This may involve, for example, destruction of all or part of the resource, or the data thereon, due to data protection requirements. In one embodiment, prior to physical removal and/or destruction of the resource, the graphical representation may be refreshed to validate the decommissioning/removal of the resource.

Figure 4:
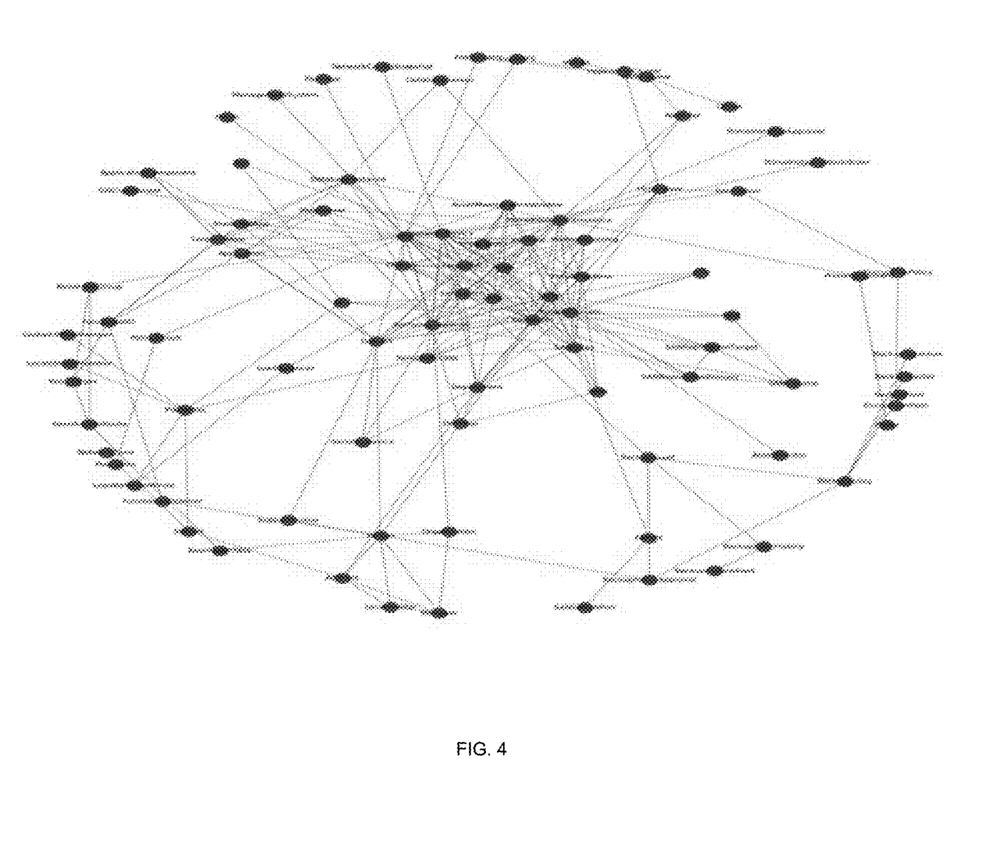
FIG. 4 is a diagram illustrating interdependencies between system resources in accordance with an embodiment.

FIG. 4 is an exemplary diagram illustrating interdependencies between system resources in accordance with an embodiment. Graph 400 illustrates multiple resources 410 connected having relationships and connections 420. The complexity of the infrastructure implies new ways to represent and reason over the relationships. A graph representing a small group of resources may be too complex for existing leveraged techniques but graph algorithms may be cleaner for integrating new resources and reasoning over the relationships.

Figure 5A:
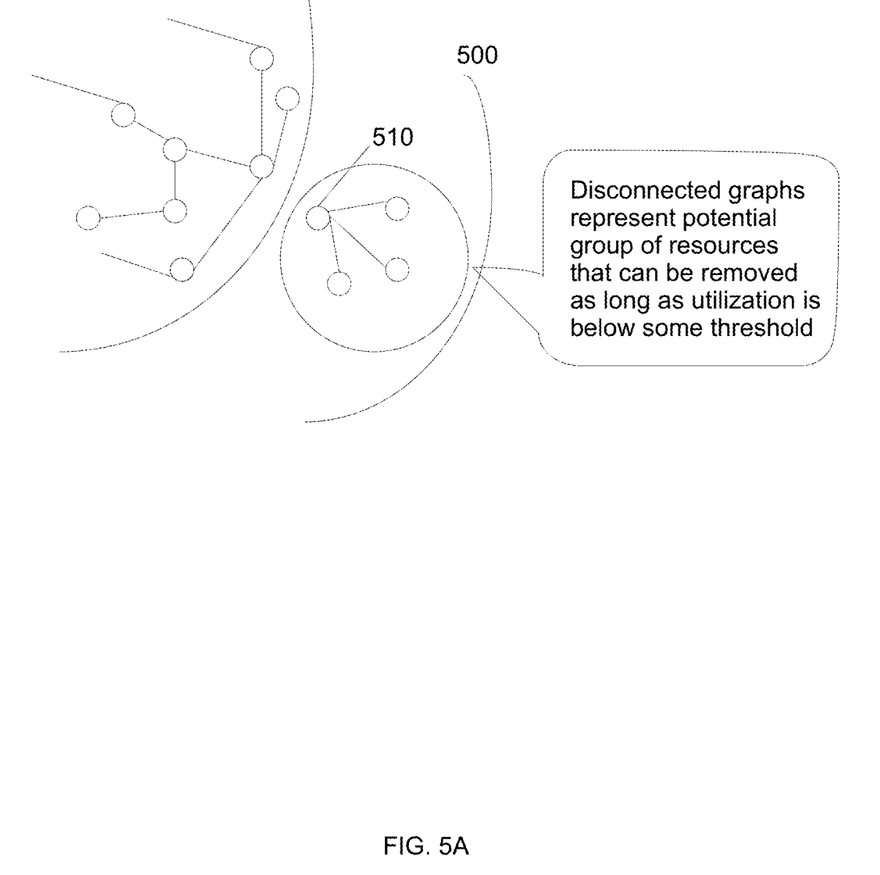
FIG. 5A is a diagram illustrating graphical analysis of disconnected resources in accordance with an embodiment.

FIG. 5A is a diagram illustrating graphical analysis 500 of disconnected resources 510 in accordance with an embodiment. Disconnected graphs represent potential groups of resources that may be removed pending determination that utilization is below a predetermined threshold and that a cost analysis illustrates benefits of decommissioning/removal.

Figure 5B:
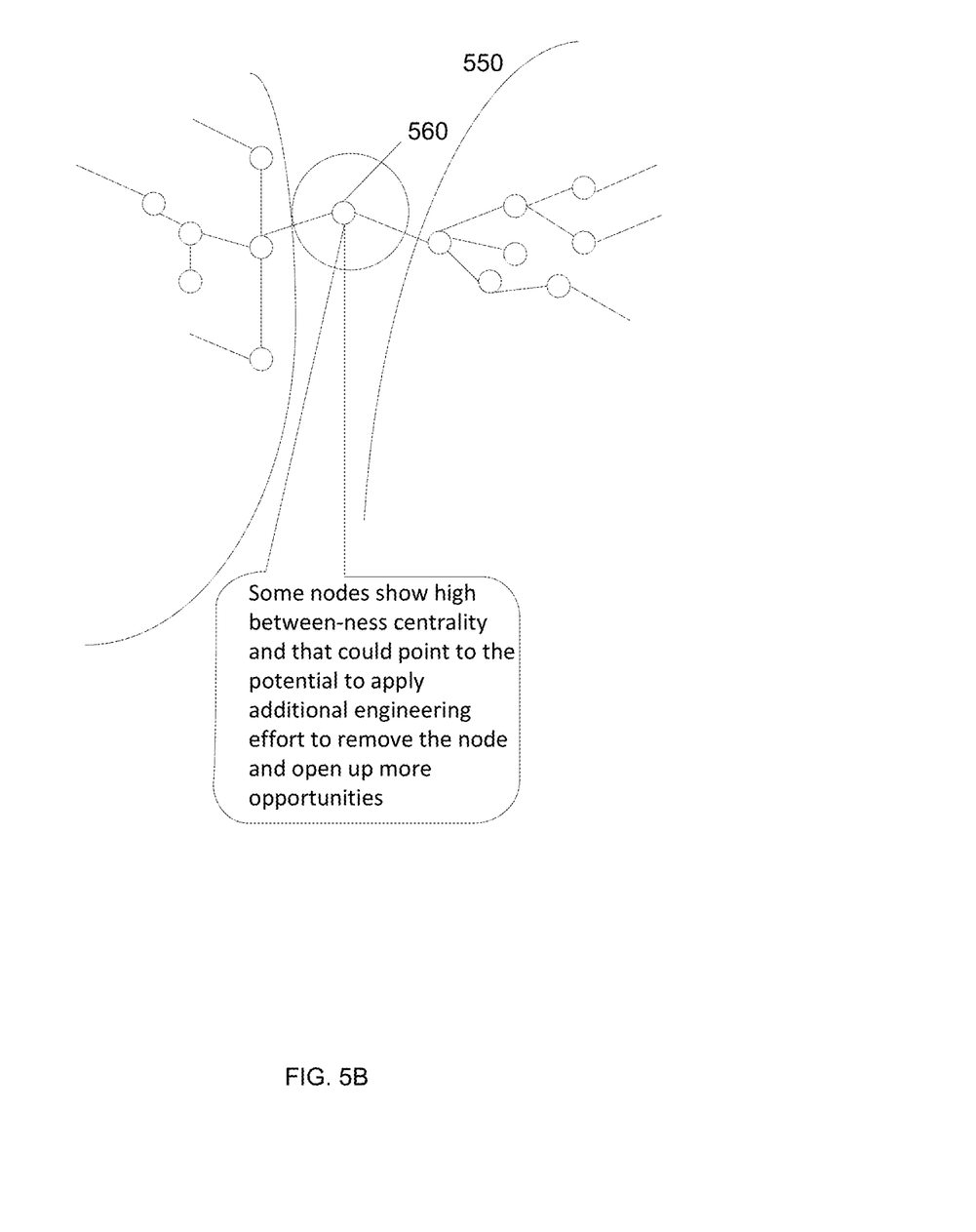
FIG. 5B is a diagram illustrating analysis of loosely connected resources in accordance with an embodiment.

FIG. 5B is a diagram 550 illustrating analysis of loosely connected resources 560 in accordance with an embodiment. As set forth above, some nodes may show high betweenness centrality. This may indicate a potential to apply an additional engineering effort to remove the loosely connected resource and reveal additional opportunities.

According, the disclosed systems and methods may apply graphical representation and analytics to infrastructure cost opportunity identification, analysis, and exploitation for financial benefit. In embodiments, the system is able to capture a complete IT infrastructure for an enterprise and thereby have the ability to reason over both existing opportunities for cost savings and to use the analytics to validate new requests for infrastructure. For example, the system may evaluate whether the requests are needed and if they would introduce duplication and unnecessary complexity and expense.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for managing resources in an IT infrastructure, the method comprising:

in an information processing apparatus comprising at least one computer processor:
retrieving, from a database, an identification of a plurality of IT infrastructure resources for an organization, wherein each of the IT infrastructure resources is registered with an infrastructure management server upon the IT infrastructure resource being onboarded or commissioned;
retrieving at least one attribute for each IT infrastructure resource, wherein the at least one attribute comprises a policy and a regulatory restriction on the IT infrastructure resource, wherein the regulatory restriction is based on a jurisdiction associated with a geographic location of the IT infrastructure resource;
graphing an IT infrastructure for the organization by illustrating a relation of each IT infrastructure resource to at least one other IT infrastructure resource, wherein graphing comprising linking the attributes for at least one IT infrastructure resource, wherein graphing further comprises identifying one or more disconnected graphs;

determining that the one or more disconnected graphs do not include information regarding all parties that utilize the at least one IT infrastructure resource, and wherein the one or more disconnected graphs have a value that represents a utilization;

analyzing the relation of each IT infrastructure resource and the linked attributes of the graph to identify a potential IT infrastructure resource for removal from the IT infrastructure for the organization, wherein the graph includes all dependencies that are validated by a script, wherein the potential IT infrastructure resource for removal is a disconnected IT infrastructure resource with an utilization below a predetermined threshold;

performing a cost analysis to isolate costs associated with the removal of the potential IT infrastructure resource for removal, wherein the analysis includes determining the cost of decommissioning/removal versus the cost of maintaining the resource in the current infrastructure;

implementing a decision engine to make removal or maintenance decisions of the potential IT infrastructure resource based on the graphing analysis and cost analysis;

performing a decommissioning script comprising migrating data from the potential IT infrastructure resource to a different IT infrastructure resource.

2. The method of claim 1, wherein the IT infrastructure for the organization is graphed using an open source graphing tool.

3. The method of claim 1, wherein the potential IT infrastructure resource for removal comprises a disconnected IT infrastructure resource.

4. The method of claim 1, wherein the potential IT infrastructure resource for removal comprises an IT infrastructure resource in a loosely attached sub-graph.

5. The method of claim 1, wherein analyzing the graph in order to identify a potential IT infrastructure resource for removal comprises identifying infrastructure dependencies among the IT infrastructure resources.

6. The method of claim 1, wherein the attribute comprises a usage of the IT infrastructure resource.

7. The method of claim 1, wherein the decision engine is a machine learning-based decision engine.

8. A system for managing resources in an IT infrastructure, the system comprising:

a server comprising a memory and a computer processor;
a database comprising an identification of a plurality of IT infrastructure resources for an organization;
a graphing engine;
a graphical analysis engine; and
a decision engine;
wherein:
    the server retrieves, from a database, the identification of the plurality of IT infrastructure resources for the organization, wherein each of the IT infrastructure resources is registered with an infrastructure management server upon the IT infrastructure resource being onboarded or commissioned;
    the server retrieves at least one attribute for each IT infrastructure resource, wherein the at least one attribute comprises a policy and a regulatory restriction on the IT infrastructure resource wherein the regulatory restriction is based on a jurisdiction associated with a geographic location of the IT infrastructure resource;

the graphing engine graphs an IT infrastructure for the organization by illustrating a relation of each IT infrastructure resource to at least one other IT infrastructure resource, wherein the graphing engine graphs by linking the attributes for at least one IT infrastructure resource, wherein the graph engine further identifies one or more disconnected graphs;

the graphing engines determines that the one or more disconnected graphs do not include information regarding all parties that utilize the at least one IT infrastructure resource, and wherein the one or more disconnected graphs have a value that represents a utilization;

the graphical analysis engine analyzes the relation of each IT infrastructure resource and the linked attributes of the graph to identify a potential IT infrastructure resource for removal from the IT infrastructure for the organization, wherein the graph includes all dependencies that are validated by a script wherein the potential IT infrastructure resource for removal is a disconnected IT infrastructure resource with an utilization below a predetermined threshold;

a cost analysis engine performs a cost analysis to isolate costs associated with the removal of the potential IT infrastructure resource for removal wherein the analysis includes determining the cost of decommissioning/removal versus the cost of maintaining the resource in the current infrastructure;

the decision engine recommends removal or maintenance of the potential IT infrastructure resource; and performing a decommissioning script comprising migrating data from the potential IT infrastructure resource to a different IT infrastructure resource.

9. The system of claim 8, wherein the graphing engine graphs the IT infrastructure for the organization using an open source graphing tool.

10. The system of claim 8, wherein the potential IT infrastructure resource for removal comprises a disconnected IT infrastructure resource.

11. The system of claim 8, wherein the potential IT infrastructure resource for removal comprises an IT infrastructure resource in a loosely attached sub-graph.

12. The system of claim 8, wherein the graphical analysis engine identifies infrastructure dependencies among the IT infrastructure resources.

13. The system of claim 8, wherein the attribute comprises a usage of the IT infrastructure resource.

14. The system of claim 8, wherein the decision engine is a machine learning-based decision engine.

15. The method of claim 1, further comprising removing the potential IT infrastructure resource by executing a decommissioning script.

16. The method of claim 1, wherein the at least one attribute of at least one IT infrastructure resource comprises an attribute that is generated at runtime.

17. The method of claim 1, wherein the policy or regulatory restriction on the IT infrastructure resource comprises a restriction on disposal of a resource.

18. The method of claim 15, further comprising:
automatically overriding the execution of the decommissioning script in response to the execution violating the policy or regulatory restriction.

19. The system of claim 8, wherein the server removes the potential IT infrastructure resource by executing a decommissioning script.

20. The system of claim 19, wherein the server automatically overrides the execution of the decommissioning script in response to the execution violating the policy or regulatory restriction.

\* \* \* \* \*